Patented Apr. 21, 1942

2,280,223

UNITED STATES PATENT OFFICE 2,280,223

COATED ELECTRODE AND WELDING ROD

Richard Dümpelmann and Paul Ehlers,
Frankfort-on-the-Main, Germany

No Drawing. Application March 6, 1940, Serial
No. 322,484. In Germany March 10, 1939

3 Claims. (Cl. 219—8)

The present invention relates to coated electrodes and welding rods; more particularly it relates to coated electrodes and welding rods which serve for welding hard metal alloys.

As hard metal alloys there may particularly be used alloys of a high content of carbon containing cobalt and chromium or tungsten or both metals which may contain additions of nickel, molybdenum, tantalum, titanium, iron or cerium.

It is already known, on welding steel with the aid of an electric arc to apply coated steel electrodes so as to keep the absorption of oxygen and nitrogen from the atmosphere as low as possible and to produce a stable electric arc. For attaining said purpose coatings are used which are applied in one layer or in several layers of different composition to the core material of the electrode and generally consist of mineral substances, particularly of mixtures of quartz, asbestos, ilmenite, aluminium-silicate or silicates of alkali metals and alkaline-earth metals. For absorbing oxygen and nitrogen metals or alloys, such as ferro-manganese, ferro-silicon, ferro-chromium or the like may be added.

Contrary thereto the purpose of the coating of hard metal electrodes or hard metal welding rods having cores of the afore-named composition is entirely different because in that case it is the object of favorably influencing the properties of the welded body, such as hardness, toughness and the property of being free from pockets, whereas an absorption of nitrogen which may occur will by no means have an unfavorable effect in the deposition of hard metal alloys.

Now we have found that there may be used with particular advantage coatings of a hard metal core which contain metal carbides or metals of the fourth, fifth or sixth group of the periodic system. Substances of these groups which may preferably be applied are silicon, titanium, zirconium, vanadium, niobium, tantalum, chromium, molybdenum, tungsten and uranium. Furthermore, it is advisable to add known mineral substances to the coatings. Mineral substances which are suitable for said purpose are for instance kaolin, quartz, borax, ilmenite, titanic acid or the like.

Weldings which have been made with the aid or hard metal electrodes coated as herein described (particularly for producing layers of hard metal alloys by welding on a base of carbon steel) are distinguished by a very good hardness which is higher than 500 Brinell units. By the kind and composition of the coating the hardness is essentially influenced and by the application of certain substances the toughness is simultaneously influenced. The higher the hardness in the welding, the more sensitive becomes the applied material to formation of cracks so that if a good hardness is attained particular care has to be taken of the toughness of the molten material.

A coating with which especially good properties are attained on welding hard metal, for instance on applying electric arc welding, may, for instance, be composed as follows:

|  | Per cent |
|---|---|
| Tungsten carbide | 20–50 |
| Tungsten | 5–15 |
| Molybdenum carbide | 10–25 |
| Vanadium | 2–10 |
| Mineral constituents, such as kaolin, quartz, titanic acid or the like | 10–30 |

Another coating which is likewise very advantageous has the following composition:

|  | Per cent |
|---|---|
| Tungsten carbide | 25–65 |
| Molybdenum carbide | 10–25 |
| Vanadium | 2–10 |
| Mineral constituents | 10–30 |

In the usual electrodes which are applied for producing layers by welding on steel only deoxidizing agents may be used in the coating and, if required, also ferro-alloys, such as FeW, FeCr and FeSi, for replacing the alloy constituents consumed. These constituents may, however, be present only in a limited quantity in an electrode or a welding rod destined for producing the hard metal weldings named; an excessive absorption of iron from the coating is thus avoided whereby the properties of the welding would be unfavorably influenced.

The coating is suitably applied by painting, pressing, spraying or dipping the electrodes or welding rods; the material to be coated is used in the pulverulent form and mixed with suitable binding agents of an organic or inorganic nature.

We claim:

1. A welding rod having a core of a hard alloy selected from the class of those comprising high carbon, cobalt-chromium alloys and high carbon, cobalt-tungsten alloys and a coating on said core essentially comprising at least 30% of a carbide of a metal of the fourth, fifth and sixth groups and from about two to about ten per cent of a metal of the same groups.

2. A welding rod having a core of a hard alloy selected from the class of those comprising high carbon, cobalt-chromium alloys and high carbon, cobalt-tungsten alloys and a coating on said core essentially consisting of from about twenty to fifty per cent of tungsten carbide, five to fifteen per cent of tungsten, ten to twenty per cent of molybdenum carbide, two to ten per cent of vanadium and ten to thirty per cent of mineral constituents.

3. A welding rod having a core of a hard alloy selected from the class of those comprising high carbon, cobalt-chromium alloys and high carbon, cobalt-tungsten alloys and a coating on said core essentially consisting of from about twenty to sixty-five per cent of tungsten carbide, ten to twenty-five per cent of molybdenum carbide, two to ten per cent of vanadium and ten to thirty per cent of mineral constituents.

RICHARD DÜMPELMANN.
PAUL EHLERS.